(12) United States Patent
Booton

(10) Patent No.: US 7,103,164 B1
(45) Date of Patent: Sep. 5, 2006

(54) COMPUTER TELEPHONY INTEGRATION

(75) Inventor: Laurence J Booton, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/936,052

(22) PCT Filed: Mar. 16, 2000

(86) PCT No.: PCT/GB00/00981

§ 371 (c)(1),
(2), (4) Date: Sep. 7, 2001

(87) PCT Pub. No.: WO00/59189

PCT Pub. Date: Oct. 5, 2000

(30) Foreign Application Priority Data

Mar. 31, 1999 (GB) .................................. 9907432.0

(51) Int. Cl.
*H04M 3/42* (2006.01)
*H04M 1/57* (2006.01)
*H04M 3/54* (2006.01)
*H04M 3/58* (2006.01)

(52) U.S. Cl. ............................ 379/201.02; 379/201.04; 379/207.14; 379/207.15; 379/211.02; 379/212.01

(58) Field of Classification Search ............ 379/201.01, 379/201.02, 201.04, 201.07, 201.08, 201.09, 379/207.14, 207.15, 211.01, 211.02, 211.03, 379/212.01, 265.01, 265.02, 265.03, 265.04
See application file for complete search history.

(56) References Cited

U.S. PATENT DOCUMENTS

| | | | |
|---|---|---|---|
| 4,682,354 A | 7/1987 | Vanacore | 379/214.01 |
| 4,956,861 A | 9/1990 | Kondo | 379/142.03 |
| 5,465,286 A | 11/1995 | Clare et al. | 379/32.04 |
| 5,642,410 A * | 6/1997 | Walsh et al. | 379/201.04 |
| 5,652,788 A | 7/1997 | Hara | 379/156 |
| 5,754,636 A * | 5/1998 | Bayless et al. | 379/142.1 |
| 5,784,452 A | 7/1998 | Carney | 379/256.06 |
| 5,940,488 A * | 8/1999 | DeGrazia et al. | 379/93.23 |
| 6,278,454 B1 * | 8/2001 | Krishnan | 715/846 |
| 6,434,226 B1 * | 8/2002 | Takahashi | 379/201.01 |
| 6,807,264 B1 * | 10/2004 | Booton | 379/201.04 |

* cited by examiner

*Primary Examiner*—Harry S. Hong
(74) *Attorney, Agent, or Firm*—Nixon & Vanderhye P.C.

(57) ABSTRACT

A CTI system in which a user's profile comprises a workgroup containing the names of other users in whose telephony status he is interested, e.g. whether they are free or busy. The user's client displays a respective icon for each of his workgroup members, the icon has a text/coloured fill section to denote that member's telephony status. When an incoming call is received, the CTI controller sends details of the incoming call to the called user and every user whose workgroup includes the called user. Thus, at the user's client, when an icon indicates that a member of his workgroup has an incoming call, the user clicks on the icon to preview the details of the incoming call. The profiles also contain a value in seconds for "Divert To Mail After", and, on receipt of the incoming call, this value is retrieved from the called user's profile and sent as part of the details of the incoming call to the called user, and to every user whose workgroup includes the called user. In each client associated with these users, a call-associated countdown timer is started from the received value. Thus, when a user previews an incoming call, the current value of the call-associated countdown timer is displayed together with other details of that incoming call.

40 Claims, 6 Drawing Sheets

| DNIS | USERNAME |
|------|----------|
| A | X |
| B | Y |
| C | Z |
| D | X |
| E | Y |

COMPUTER TELEPHONY INTEGRATION

This invention relates to the use of a computer for controlling the operation of a telephony system, such use is known in the art as computer telephony integration (CTI), and the systems employing such control are known as CTI systems.

As a general background, the reader will find examples of such CTI systems disclosed in the articles "Introduction to Computer Telephony Integration", by A. Catchpole, G. Crook, and D. Chesterman, British Telecommunications Engineering, Vol. 14, July 1995; "Computer Telephony Integration—The Meridian Norstar", by A. Catchpole, British Telecommunications Engineering, Vol. 14, October 1995; "Computer Telephony Integration—The Meridian 1 PBX", by P. Johnson, A. Catchpole, and L. Booton, British Telecommunications Engineering, Vol. 15, July 1996; "Callscape—Computer Telephony Integration for the Small Business", by G. Hillson, G. Hardcastle, and M. Allington, British Telecommunications Engineering, Vol. 15, January 1997, and "Call Centres—Doing Business by Telephone" by M. Bonner, British Telecommunications Engineering, Vol. 13, July 1994.

Furthermore, a method is known of operating a CTI system comprising a CTI-enabled PBX, an associated CTI controller, and a plurality of user workstations, each workstation comprising a computer connected to the CTI controller and a telephone connected to the PBX In this method, the CTI controller stores respective user-associated profiles, each including a user-associated workgroup containing names of users of the system, in whose telephony status the user associated with that workgroup is interested, and the PBX on receipt of an incoming call retrieves from the signalling data a dialled number (known as the Dialled Number Identification Service number (DNIS)) and the calling line identity or identification (CLI), and passes these to the CTI controller. The CTI controller translates the DNIS to a username for the called user and accesses the workgroups to find out which contain that username. The CTI controller then sends a message containing that username to each computer at which a user, whose workgroup contains that username, is currently logged on to the CTI controller. It will be appreciated that in the art, the terms log on, logon, log in and login are synonymous and interchangeable, as are the terms log off, logoff, log out and logout.

While a user is currently logged on to the CTI controller, his computer displays a respective set of icons representing the members of that user's workgroup, the icons being in the form of respective facial images, each icon including a text display, e.g. "Free", to indicate the current telephony status of the corresponding user, and upon receipt of this message, the computers change the text display of the icon corresponding to the received user name to "Ringing". A user can answer an incoming call for a member of his workgroup by sending an answer message from his computer to the CTI controller, and the CTI controller responds by commanding the PBX to connect the incoming call to that user's telephone. This method is referred to as Distributed Office Telephony (DOT).

According to a first aspect of the present invention there is provided a method of operating a computer telephony integration (CTI) system comprising a switch and a CTI controller therefor, and a plurality of user workstations, each workstation comprising a computer connected to the CTI controller and a telephone connected to the switch, the method comprising the steps of:

storing, for users of the system, respective user-associated profiles, each including a user-associated workgroup containing identities of users of the system, in whose telephony status the user associated with that workgroup is interested;

responding to receipt of an incoming call at the switch by retrieving from signalling data of that incoming call a called user identity and a caller identity;

retrieving from the profile corresponding to the retrieved called user identity a value for the length of time that the incoming call is to be allowed to remain unanswered before routing the call to an answering facility;

starting a call-associated countdown from said value;

sending incoming call details including at least said called user identity from the CTI controller to each computer at which a user, whose workgroup contains that called user identity, is currently logged on to the CTI controller, such computer being referred to hereinafter as an active computer;

responding to receipt of said incoming call details at said active computers by displaying an indication that an incoming call has been received for the called user; and responding to a request, made by a user at a said active computer, for details of that incoming call, by displaying at that active computer details of that incoming call comprising the current value of said call-associated countdown and at least said caller identity, such a user being referred to hereinafter as a previewing user.

An advantage of this aspect of the present invention is that a user can preview the call details of an incoming call for a member of his workgroup, in particular the remaining time before the call will be sent to an answering service, without answering the call, and can make a more informed decision as to whether or not to answer that call. In a practical embodiment, the user makes his request by clicking on the icon corresponding to the called user.

Preferably, the call-associated countdown is performed by the CTI controller, the step of responding to a said request comprises a substep of requesting from the CTI controller the current value of said call-associated countdown, and there are included the steps of sending the requested current value to the computer of the previewing user in response to the request for said current value, and starting in that computer a call-associated countdown from the current value received thereat.

Alternatively, the step of sending incoming call details to each active computer includes sending said retrieved value, and each said active computer performs a respective call-associated countdown.

There may be included the steps of:

maintaining, for said incoming call, a respective call-associated previewing user list by adding to that list the identity of a previewing user upon the making of said request and deleting from that list the identity of a previewing user upon receipt of a message indicating that that previewing user has ceased to preview the details of that incoming call;

upon each change in the content of said previewing user list, sending the latest previewing user list, from the CTI controller to each active computer; and while displaying the details of said incoming call at a said active computer, additionally displaying the latest received previewing user list.

Preferably, there are included the steps of starting, in each respective active computer, a respective preview duration measurement for each new previewing user in the latest received previewing user list, and, while displaying the latest received previewing user list, additionally displaying, for each displayed previewing user, the current value of the respective preview duration measurement.

Preferably, the step of sending incoming call details to each active computer includes sending a caller identity. Alternatively, the step of responding to a said request comprises a substep of requesting from the CTI controller the caller identity of that incoming call, and there is included the step of sending the requested caller identity to the computer of the previewing user in response to the request for said caller identity.

According to a second aspect of the present invention there is provided a method of operating a computer telephony integration (CTI) system comprising a switch and a CTI controller therefor, and a plurality of user workstations, each workstation comprising a computer connected to the CTI controller and a telephone connected to the switch, the method comprising the steps of:
- storing, for users of the system, respective user-associated profiles, each including a user-associated workgroup containing identities of users of the system, in whose telephony status the user associated with that workgroup is interested;
- responding to receipt of an incoming call at the switch by retrieving from signalling data of that incoming call a called user identity and a calling line indication;
- sending incoming call details, including at least said called user identity and said calling line indication, from the CTI controller to each computer at which a user, whose workgroup list contains that called user identity, is currently logged on to the CTI controller, such computer being referred to hereinafter as an active computer;
- responding to receipt of said incoming call details at said active computers by displaying an indication that an incoming call has been received for the called user;
- answering said incoming call;
- sending an indication that the incoming call has been answered, from the CTI controller to said active computers, and in response converting the display thereat to an indication that the incoming call has been answered;
- responding to a request, made by a user at a said active computer, for details of that answered call, by displaying at that active computer details of that answered call comprising at least said calling line indication, such a user being referred to hereinafter as an interrogating user.

An advantage of this aspect of the present invention is that a user can interrogate the call details of an answered call for a member of his workgroup, and can make a more informed decision as to his future telephony actions with regard to that answered call. For example, the user may have "intrude" rights with respect to members of his workgroup who are at a lower level within a corporate hierarchy, e.g. people who he manages, and when the user interrogates a call-in-progress involving such a person, he can see the identity of the other party. The user can then make a decision based on the known identity of that other party as to whether, should it be his intention, to intrude on that call.

Preferably, the step of responding to a said request comprises a substep of requesting from the CTI controller the caller identity of that answered call, and there is included the step of sending the requested caller identity to the computer of the interrogating user in response to the request for said caller identity.

There may be included the step of further responding to the answering of the incoming call by starting a call-associated call duration measurement; and the response of receipt of said request may include additionally displaying the current value of said call duration measurement.

Preferably, said call duration measurement is performed by the CTI controller, and wherein the step of responding to a said request comprises a substep of requesting from the CTI controller the current value of said call duration measurement, and there are included the steps of sending the requested current value to the computer of the interrogating user in response to the request for said current value, and starting in that computer a call-associated timer from the current value received thereat.

Alternatively, each said active computer starts a respective call-associated timer upon receipt of the indication that the incoming call has been answered.

Preferably, there are included the steps of:
- maintaining at the CTI controller, for said answered incoming call, a respective call-associated interrogating user list by adding to that list the identity of an interrogating user upon the making of said request and deleting from that list the identity of an interrogating user upon receipt of a message indicating that that interrogating user has ceased to interrogate the details of that answered call;
- upon each change in the content of said interrogating user list, sending the current interrogating user list from the CTI controller to each active computer; and
- while displaying the details of said answered incoming call at a said active computer, additionally displaying the latest received interrogating user list.

More preferably, there are included the steps of timing for each interrogating user the respective interrogation duration; and, while displaying the latest received list of interrogating users, additionally displaying, for each displayed interrogating user, the current value of the respective interrogation duration.

Yet more preferably, each active computer performs said step of timing for each interrogating user the respective interrogation duration.

There may be included the steps of:
- accessing a caller identity-to-name translation table in accordance with the retrieved caller identity; and
- if a corresponding caller name is retrieved, displaying the retrieved caller name in conjunction with said caller identity,
- else, displaying in conjunction with said caller identity an indication that the caller is unknown.

Alternatively, there may be included the steps of accessing, in accordance with the retrieved caller identity, a caller identity-to-personal name translation table associated with the caller user; and,
- if a corresponding personal name is retrieved, displaying the retrieved personal name in conjunction with said caller identity.

Preferably, there are included, when a corresponding personal name is not retrieved, the steps of:
- accessing a system-associated caller identity-to-name translation table in accordance with the retrieved caller identity; and
- if a corresponding caller name is retrieved, displaying the retrieved caller name in conjunction with said caller identity,
- else, displaying in conjunction with said caller identity an indication that the caller is unknown.

There may be included the step of downloading a user's caller identity-to-personal name translation table from the CTI controller upon log on of that user to the CTI controller, and the step of accessing a caller identity-to-personal name translation table associated with the called user may be performed by the respective user active computer.

There may be included the steps of:
accessing, in the CTI controller, a system-associated caller identity-to-name translation table in accordance with the retrieved caller identity; and,
if a corresponding caller name is retrieved, sending the retrieved caller name from the CTI controller to each active computer for display in conjunction with said caller identity,
else, sending from the CTI controller to each active computer, for display in conjunction with said caller identity, an indication that the caller is unknown.

According to a third aspect of the present invention there is provided a computer telephony integration (CTI) system comprising a switch and a CTI controller therefor, and a plurality of user workstations, each workstation comprising a computer connected to the CTI controller and a telephone connected to the switch, in which system the CTI controller is arranged:
to store, for users of the system, respective user-associated profiles, each profile being arranged to include a user-associated workgroup for containing identities of users of the system, in whose telephony status the user associated with that workgroup is interested, and being arranged to store a value for the length of time that an incoming call is to be allowed to remain unanswered before routing the call to an answering facility;
to respond to receipt of an incoming call at the switch by retrieving from signalling data of that incoming call a called user identity and a caller identity; and
to retrieve from the profile corresponding to the retrieved called user identity a said value;
to send incoming call details including at least said called user identity to each computer at which a user, whose workgroup contains that called user identity, is currently logged on to the CTI controller, such computer being referred to hereinafter as an active computer; and
each active computer being responsive to receipt of said incoming call details at said active computers to display an indication that an incoming call has been received for the called user; and
the system further comprising:
means for performing a call-associated countdown starting from said value;
means responsive to a request, made by a user at a said active computer, for details of that incoming call, to display at that active computer details of that incoming call comprising the current value of said call-associated countdown and at least said caller identity, such a user being referred to hereinafter as a previewing user.

Preferably, the CTI controller constitutes said means for performing a call-associated countdown and is responsive to a request for said current value to send the requested current value to the computer of the previewing user, and each computer constitutes a respective means responsive to a request for details of that incoming call and is arranged to request from the CTI controller the current value of said call-associated countdown and to start a call-associated countdown from the current value received thereat.

Alternatively, the CTI controller is arranged to send said retrieved value to each active computer as part of the incoming call details; and each computer constitutes a respective means for performing a call-associated countdown starting from said value, and a respective means responsive to a request, and is arranged additionally to display the current value of said call-associated countdown.

Preferably, the CTI controller is arranged to maintain, for said incoming call, a respective call-associated previewing user list by adding to that list the identity of a previewing user upon the making of said request and deleting from that list the identity of a previewing user upon receipt of a message indicating that that previewing user has ceased to preview the details of that incoming call, and to send to each active computer, upon each change in the content of said previewing user list, the latest previewing user list; and said means responsive to a request for details of that incoming call may be arranged, while displaying the details of said incoming call at a said active computer, additionally to display the latest received previewing user list.

More preferably, each computer is arranged to start a respective countup timer for each new previewing user in the latest received previewing user list, and, while displaying the latest received previewing user list, additionally to display, for each displayed previewing user, the current value in the respective countup timer.

Preferably, the CTI controller is arranged to send a caller identity in conjunction with said called user identity Alternatively, the means responsive to a request for details of that incoming call is constituted by the CTI controller together with respective means at the active computers arranged to request from the CTI controller the caller identity of that incoming call, the CTI controller being responsive to the request for said caller identity to send the requested caller identity to the computer of the previewing user.

According to a fourth aspect of the present invention there is provided a computer telephony integration (CTI) system comprising a switch and a CTI controller therefor, and a plurality of user workstations, each workstation comprising a computer connected to the CTI controller and a telephone connected to the switch, in which system:

the CTI controller is arranged
to store, for users of the system, respective user-associated profiles, each including a user-associated workgroup containing identities of users of the system, in whose telephony status the user associated with that workgroup is interested;
to respond to receipt of an incoming call at the switch by retrieving from signalling data of that incoming call a called user identity and a caller identity;
to send incoming call details, including at least said called user identity and said caller identity, to each computer at which a user, whose workgroup contains that called user identity, is currently logged on to the CTI controller, such computer being referred to hereinafter as an active computer; and
to respond to answering of said incoming call by sending an indication that the incoming call has been answered to said active computers;

each computer is arranged, when active,
to respond to receipt of said incoming call details by displaying an indication that an incoming call has been received for the called user, and
to respond to receipt of the indication that the incoming call has been answered by converting the display thereat to an indication that the incoming call has been answered; and there is provided
   means responsive to a request, made by a user at a said active computer, for details of that answered call, to display at that active computer details of that answered call comprising at least said caller identity, such a user being referred to hereinafter as an interrogating user.

Preferably, the means responsive to a request for details of that answered call is constituted by the CTI controller together with respective means at the computers arranged to request from the CTI controller the caller identity of that incoming call, the CTI controller being responsive to the request for said caller identity to send the requested caller identity to the computer of the interrogating user.

There may be included means for responding to the answering of the incoming call by starting a call-associated call duration measurement; and the means responsive to a request for details of that answered call may be arranged additionally to display the current value of said call duration measurement.

Preferably, said means for responding to the answering of the incoming call is constituted by the CTI controller; and the means responsive to a request for details of that answered call is additionally arranged to request from the CTI controller the current value of said call duration measurement, to associate a timer with that answered call and to start that timer from the current value received from the CTI controller.

Alternatively, each computer constitutes
   a respective said means for responding to the answering of the incoming call by starting a call-associated call duration measurement and is arranged to start a respective call-associated timer upon receipt of the indication that the incoming call has been answered, and
   a respective said means responsive to a request for details of that answered call, to display at that active computer details of that answered call, and
   is arranged additionally to display the current value of said call duration measurement.

Preferably, the CTI controller is arranged to maintain, for said answered incoming call, a respective call-associated interrogating user list by adding to that list the identity of an interrogating user upon the making of said request and deleting from that list the identity of an interrogating user upon receipt of a message indicating that the interrogating user has ceased to interrogate the details of that answered call; and to send to each active computer, upon each change in the content of said interrogating user list, the latest interrogating user list; and said means responsive to a request for details of that answered call is arranged, while displaying the details of said answered call at a said active computer, additionally to display the latest received interrogating user list.

Preferably, there is included means for timing for each interrogating user the respective interrogation duration; and the means responsive to a request is arranged additionally to display, for each displayed interrogating user, the current value of the respective interrogation duration.

Preferably, each active computer constitutes a respective means for timing for each interrogating user the respective interrogation duration.

There may be included caller identity-to-name translation means responsive to the retrieved called identity to provide a translation result, and the means responsive to a request may be arranged to display the translation result in conjunction with said caller identity.

Preferably, the caller identity-to-name translation means includes a system-associated caller identity-to-name translation table and respective user-associated caller identity-to-personal name translation tables.

More preferably, the caller identity-to-name translation means is arranged to access the system-associated caller identity-to-name translation table only in the event that accessing the caller identity-to-personal name translation table associated with the called user fails to retrieve a corresponding personal name.

Yet more preferably, the CTI controller is responsive to log on of a user to the CTI controller to download that user's caller identity-to-personal name translation table to the computer at which that log on is performed, and that user's computer constitutes part of said caller identity-to-name translation means.

Yet more preferably, the system-associated caller identity-to-name translation table is disposed at the CTI controller, and the caller identity-to-name translation means is responsive to the retrieved caller identity to access the system-associated caller identity-to-name translation table and provide a translation result in the form of either a retrieved corresponding caller name or an indication that the caller is unknown, and is arranged to send the translation result from the CTI controller to each active computer for display in conjunction with said caller identity.

Preferred embodiments of apparatus and methods of the present invention will now be described by way of example with reference to the drawings, in which:

FIG. 5 shows the structure of part of a number-to-name translation table used by the CTI server.

In this description the following acronyms are used:
CLI—Calling Line Indication, also known as Calling Line Identity,
CSTA—Computer Supported Telecommunications Applications,
CTI—Computer Telephony Integration,
DNIS—Dialled Number Identification Service number,
DOT—Distributed Office Telephony,
ISDN—Integrated Services Digital Network,
LAN—Local Area Network,
PBX—Private Branch Exchange,
RAM—Random Access Memory,
ROM—Read Only Memory.

Figure 1:
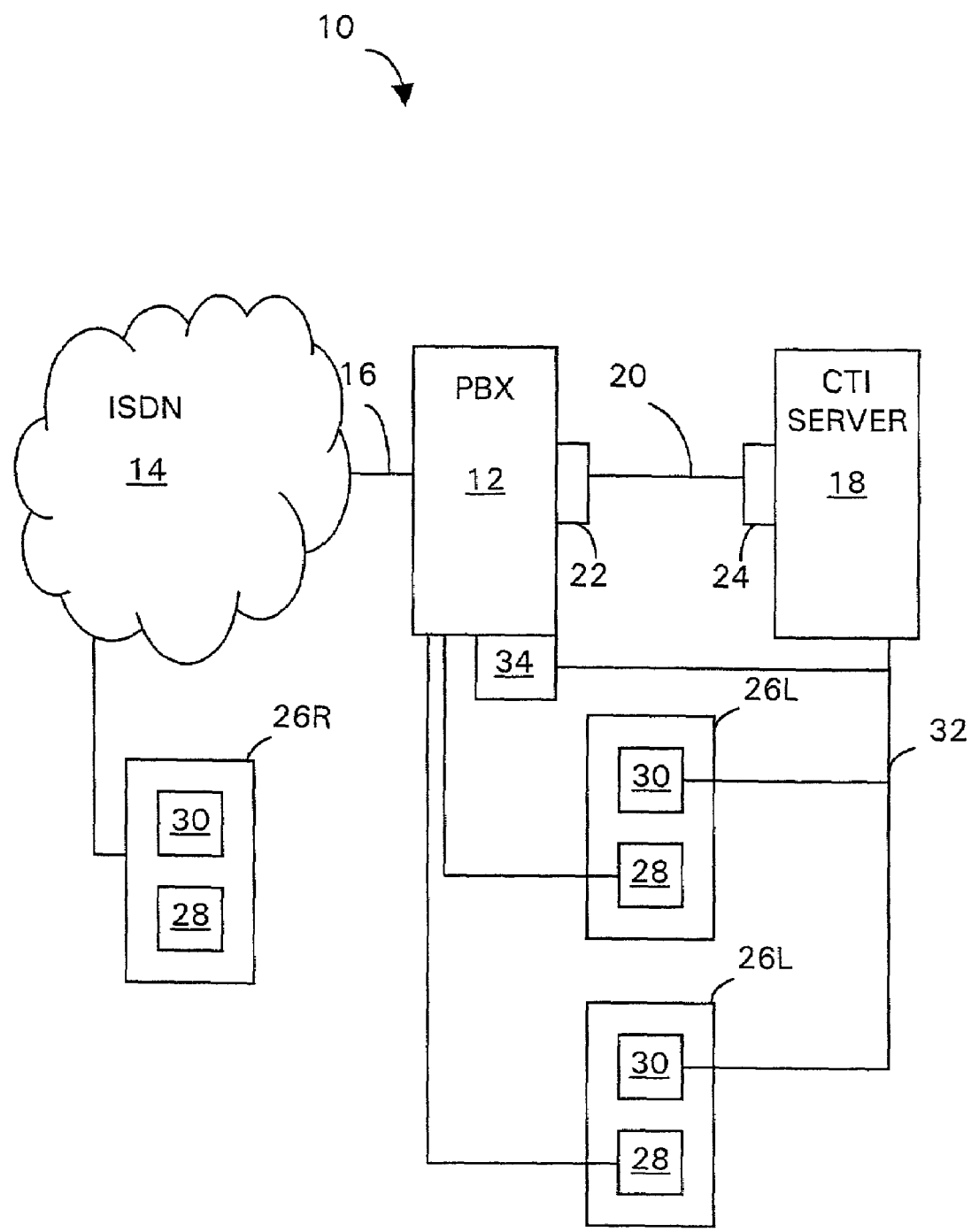
FIG. 1 is a block diagram of an apparatus of the present invention.

In FIG. 1 there is shown a CTI system 10 comprising a CTI-enabled PBX 12, constituting a switch of the present invention, connected to an ISDN 14 via an ISDN primary rate link 16, and a CTI server 18 connected to the PBX 12 via a data link 20. The PBX 12 has a CTI interface 22 which operates in accordance with the abovementioned CTI protocol, CSTA, and the CTI server 18 has a CTI interface 24 which operates in accordance with that protocol. There are a number of proprietary CTI protocols, e.g. Meridian Link from Northern Telecom, and several "open", or proposed standard, CTI protocols, including CSTA, but the performance of the present invention is not dependent upon the use of any particular CTI protocol.

The CTI system 10 also comprises a plurality of work desks, also known as workstations, 26R, situated remotely from the PBX 12, and a plurality of work desks 26L, situated locally to the PBX 12, each work desk having a respective telephone terminal 28R, 28L, referred to hereinafter as a telephone, and a respective computer terminal 30R, 30L, referred to hereinafter as a CTI client, or just client. For convenience, only one remote work desk 26R and only two local work desks 26L are shown.

The CTI server 18, which constitutes a CTI controller of the present invention, and the local CTI clients 30L are directly connected to a LAN 32, and each remote CTI client 30R is indirectly connected to the LAN 32 via the ISDN 14 when a user at the respective remote work desk 26R makes a call to a predetermined destination number for access to the LAN 32. The PBX 12 receives that call and connects it to a corresponding port which is connected to the LAN 32 via an ISDN/LAN bridge 34. In this description, the terms user and workgroup member are used interchangeably and synonymously.

Figure 2:
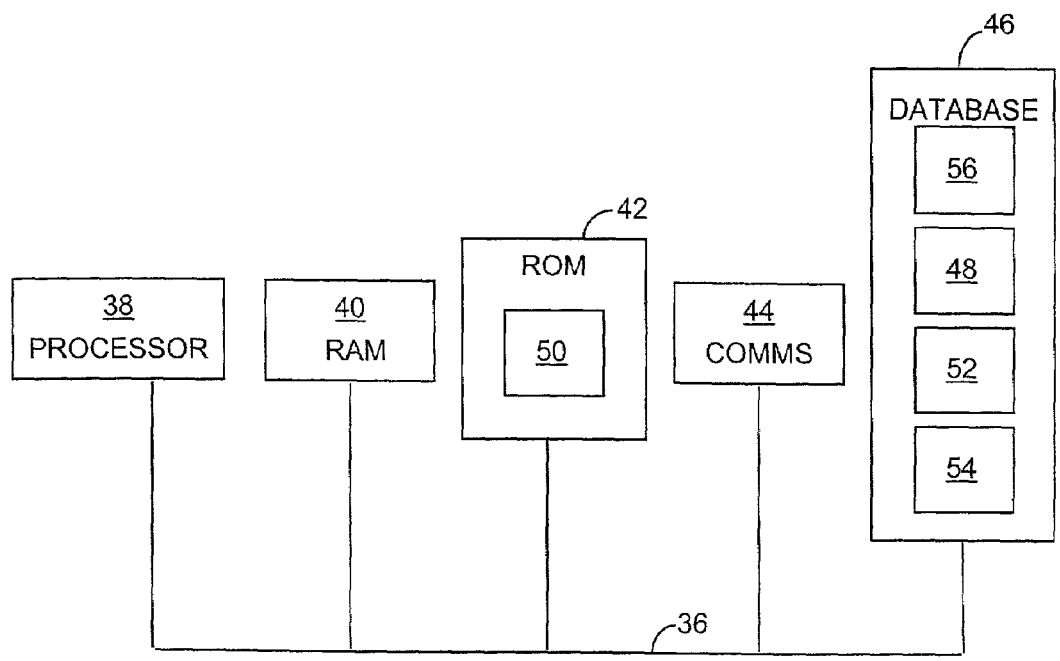
FIG. 2 shows the component parts of a CTI server of the apparatus of FIG. 1.

In FIG. 2, the CTI server 18 comprises an internal bus 36 to which is connected a processor 38, a RAM 40, a ROM 42, a data communications stack 44, and a database 46. The ROM 42 contains a conventional operating system program for controlling the processor 38, and a CTI program 50 for performing DOT functions including managing user profiles 52, and tables 54. The database 46 stores call logs 56, the user profiles 52, the tables 54, and user-associated stores 48. Each respective store 48 can, as described in more detail later, be thought of as a "Who is interested in my telephony status?" store containing the identities of other users who have included that respective user in their workgroup.

Figure 4:
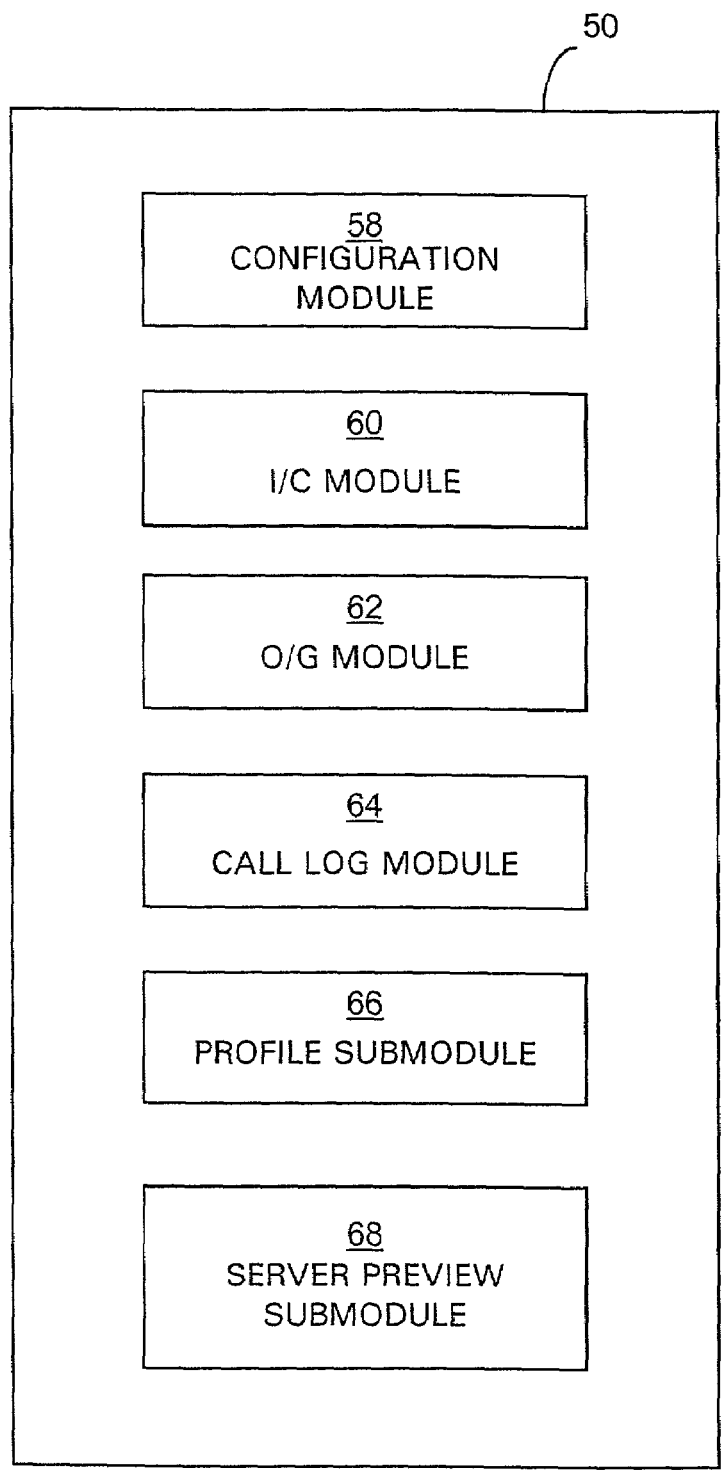
FIG. 4 shows the modules of a CTI program which controls the operation of the CTI server.

As shown in FIG. 4, the CTI program 50 comprises a number of main modules, namely a Configuration module 58, an Incoming Call module 60, an Outgoing Call module 62, and a Call Log module 64. As is known in the art, these main modules comprise submodules for performing various parts of their main function, for example, the Configuration module 58 comprises a Profile submodule 66 for managing the user profiles 52. Certain submodules which relate to known CTI functions, e.g. Display Incoming Call Details submodule, will be known to the skilled person in the art and will not be described. The functions of only those submodules relevant to the present invention will be described in detail in this description, in particular a Server Preview submodule 68 for performing the present invention and which forms part of the Incoming Call module 60.

Figure 5:
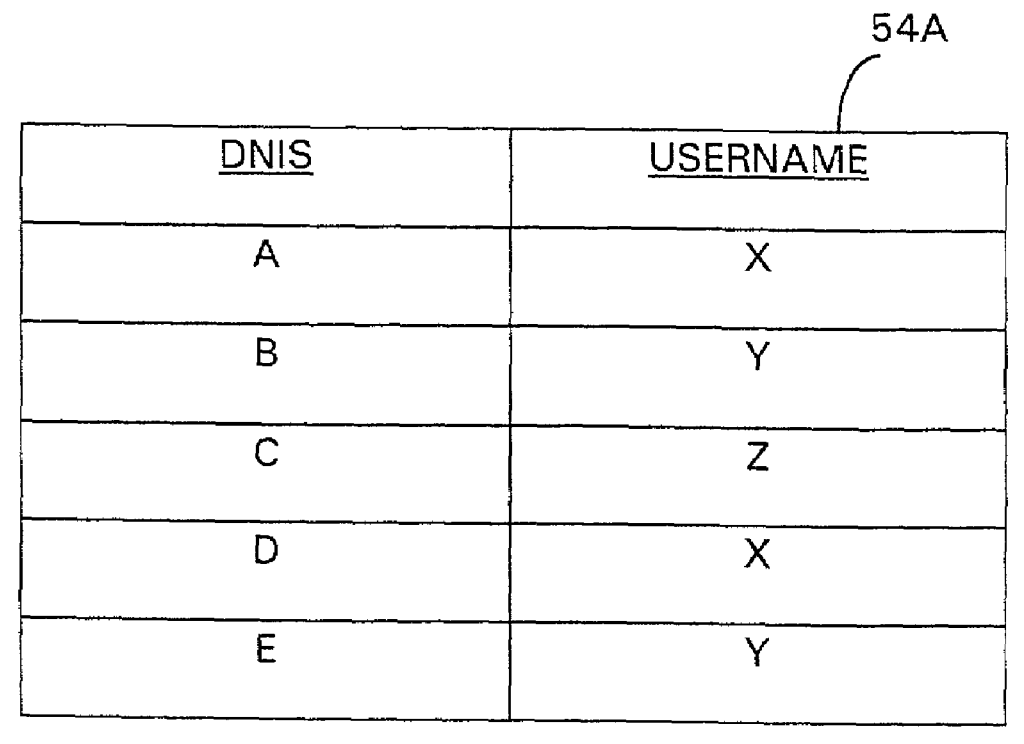

Conceptually, the tables 54 stored in the database 46 are a DNIS-to-username translation table 54A (shown in FIG. 5), a CLI-to-callername translation table 54B, a calledname-to-number translation table 54C, and respective user personal directories 54D. However, in practice, the database 46 contains just a single generic number/name translation table 54, which is used for DNIS-to-username translation, CLI-to-callername translation, calledname-to-number translation, and the respective user personal directories. Tables 54A to 54C constitute system-associated translation tables of the present invention, and table 54D constitutes a called user translation table of the present invention.

Figure 3:
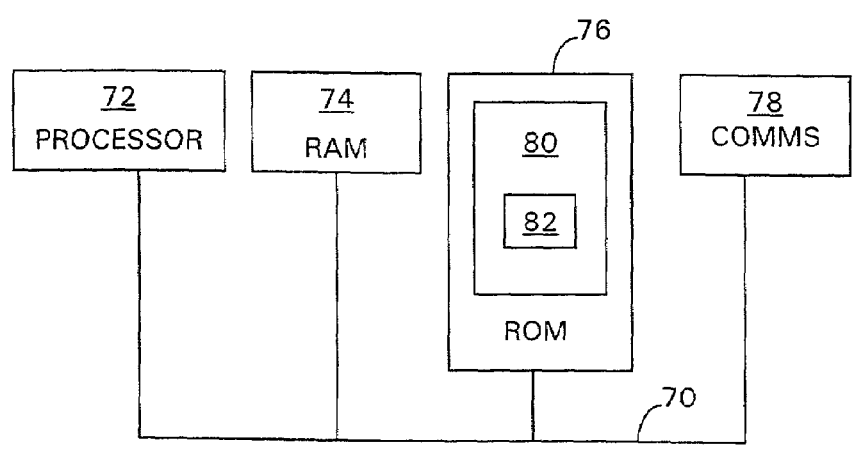
FIG. 3 shows the component parts of a CTI client of the apparatus of FIG. 1.

As shown in FIG. 3, the CTI client 30L comprises an internal bus 70 to which is connected a processor 72, a RAM 74, a ROM 76, and a data communications stack 78. The ROM 76 contains an operating system program for controlling the processor 72, and also contains a CTI program 80 for the operation of the CTI client 30L, in particular, a Client Preview module 82 for performing the present invention.

The CTI program 80 is launched in the conventional manner, e.g. by the user clicking on an application icon on the screen of the client at which he is logged in, and CTI program 80 generates a window on the screen of the client. This window is referred to as the main DOT window, and, in addition to conventional window control icons, e.g. minimise window, it contains workgroup member icons, buttons for Dial, Configure and About, and text display for indicating the number of Missed Calls, and the number of Voice Mails. The terms Mail and VMail are used synonymously and interchangeably for Voice Mail.

The user modifies his personal profile 52 by clicking on the Configure button. The user's client sends a message to the CTI server 18, and the Configuration module 58 responds by causing a Configuration window to appear on the screen of the client. This window contains tabs for Logged In Actions, Logged Out Actions, Workgroup, My Desk, and Divert, the tab for Logged In Actions being the default selection. The user's client relays all data entries and mouse clicks to the CTI server 18, where they are received and processed by the Configuration module 58, which manages the user's profile in response, and sends return messages to the user's client, in conventional manner.

The tab pane for Logged In Actions has an upper section containing two radio buttons, one for Divert To Mail, and the other for Divert To Mail After Timeout, the latter being associated with a text box for the user to enter a timeout in seconds; and a lower section for Additional Numbers, i.e. numbers in addition to the number of the telephone, referred to as This Desk, associated with the user's client, which will have been already entered in a Logged In Actions number list by the system administrator. This lower section contains check boxes for Home, Mobile and Other, this last being associated with a text box for the user to enter a telephone number.

In this embodiment, the user has to supply his home and mobile numbers to the system administrator for entry in the Logged In Actions number list in the user's profile. In variants, the tab pane includes an Add button which gives the user access to the number-to-name translation table 54 via an Add Logged In Target window containing text entry boxes so that he can enter his own choice of Name, Number and notes relating to that person or company, and a similar Delete button provides a Delete Logged In Target window for the user to select an entry for deletion.

Typically, the user will select Divert To Mail After Timeout and set a time of 20 seconds.

The tab pane for Logged Out Actions is identical to that for Logged In Actions, and the user might typically select Home, Mobile and Divert To Mail After Timeout and set a time of 30 seconds. In contrast to the Logged In Actions, the Logged Out Actions does not have a system administrator entry for the This Desk number.

The tab pane for the Workgroup facility includes a window for the user to select names from a User List, also known as a global directory, and to add these selected names to the user's workgroup, i.e. the list of people in whose telephony actions the user is interested. This workgroup contains the user's name as the default condition. For security, users are assigned a category corresponding to their principal function within a company, e.g. research, and may be assigned one or more further categories by their company administration, e.g. finance, personnel, patents, upon request and after suitable clearance. For example, research engineers may only be permitted to include "research" users in their workgroup, whereas a Head of Section may be permitted to include patents users, and a Head of Division may be permitted to include all users.

The tab pane for the My Desk facility provides a facility for the user to determine his preferred manner of Desktop Alerting. There are respective check boxes for Bring Your Desktop to the Front, and for Bring Workgroup Members Desktop to Front. The former check box relates to the user's Desktop, which is an icon in the form of a colour image of the user's face immediately above a text bar in which is indicated the user's telephony status. If the user is not logged on at a work desk 26, the CTI server 18 instructs that client 30 to display "Free" in the telephony status bar with grey fill, i.e. background colour. If the user has logged on at a work desk 26, the CTI server 18 instructs that client 30 to display "Free" in the telephony status bar with green fill; and when an incoming call has been received for that user, the CTI server 18 instructs that client 30 to display the callername (or "Unknown") in the telephony status bar with red fill; and when the user has answered the call, the CTI server 18 instructs that client 30 to display "Busy" in the telephony status bar with yellow fill. Each person of the User List will have a corresponding Desktop icon, though a person's icon will be blank if the administration has not yet loaded an image for that particular user. The latter check box relates to the user's personal workgroup,, i.e. the set of names that the user selected using the Workgroup facility mentioned above.

The tab pane of the My Desk window also includes radio buttons for the user to select from Popup Call Window Immediately, or Popup Call Window After, and this latter radio button is associated with a text box for the user to enter the number of seconds of delay. There is also a check box for Display Call Routing Messages on Login and Logout, which is a display of either the user's currently recorded Logged In Actions or the user's currently recorded Logged Out Actions, so that if this box is checked the user will upon login see a window containing his current logged in actions, and upon logout see a window containing his current logged out actions. This option provides the user with a reminder of the current call routing actions that he has entered into his profile via the configuration facility, and if the user wishes to change the call routing actions for the following period he can do this via the configure window.

The tab pane for the Divert facility provides a facility for the user to determine whether or not to enable an overriding divert action. There are respective check boxes for Enable Divert, and for Enable Divert on Logout, and a text box for the user to enter either a telephone number or a name, e.g. Mail. The CTI server 18 has an entry in its number-to-name translation table 54 for Mail, containing the number of a Voice Mail facility, and this will have been entered by the system administrator. If the user selects Enable Divert, he will be taken out of all workgroups established by other users.

When the user launches the DOT application, the Profile submodule 66 retrieves a copy of the user's personal directory from the personal directories 54D and downloads it to the user's client. By delegating the searching of the user's personal directory to the client, the CTI server 18 is able to send a common message to the clients of all workgroup members, including the user himself.

The CTI server 18 manages a set of respective user-associated "Who is interested in my calls?" stores 48 held on the database 46, and each of these stores includes the username of its associated user by default. When the user launches the DOT application the CTI server 18 also retrieves the user's workgroup from the user's profile, and writes that user's username into respective stores 48 corresponding to the users in the workgroup. For example, if that user has the username A and has a workgroup list containing the usernames B, D and G, then the CTI server 18 will write A to the stores 48 corresponding to usernames B, D and G.

When that user closes down his DOT application, the CTI server 18 deletes A from the stores 48 corresponding to usernames B, D and G.

In a variant, instead of the stores 48 there is provided a logically equivalent arrangement wherein the CTI server 18 associates a respective session data store, referred to simply as a session, with a user when that user logs on to the CTI server 18. The session contains the network identity of the client at which the user logs on, the telephone number associated with that client, and the call data of each current call associated with that user. When a call is received for a user, the Server Preview submodule 68 checks the workgroup of each user who has a current session, i.e. is logged on, and for each such workgroup that contains the identity of the called user sends a Call Received message, described below, to the user associated with such workgroup. In a further variant, the CTI server 18 maintains a list of all users who are currently logged on, also referred to as being active, and this list is referred to as the active list. Thus references to messages being sent to those members of the workgroup who are currently active encompass any of the above methods, or equivalent methods, of ascertaining which of the members are currently logged on at a client. As an example of the use of an active list, if a call is received for, say, username B, then for each entry in the active list the respective workgroup is accessed to see whether it contains the username B, and if so, then the user associated with that workgroup is sent a Call Received message in respect to the incoming call.

Figure 6A:
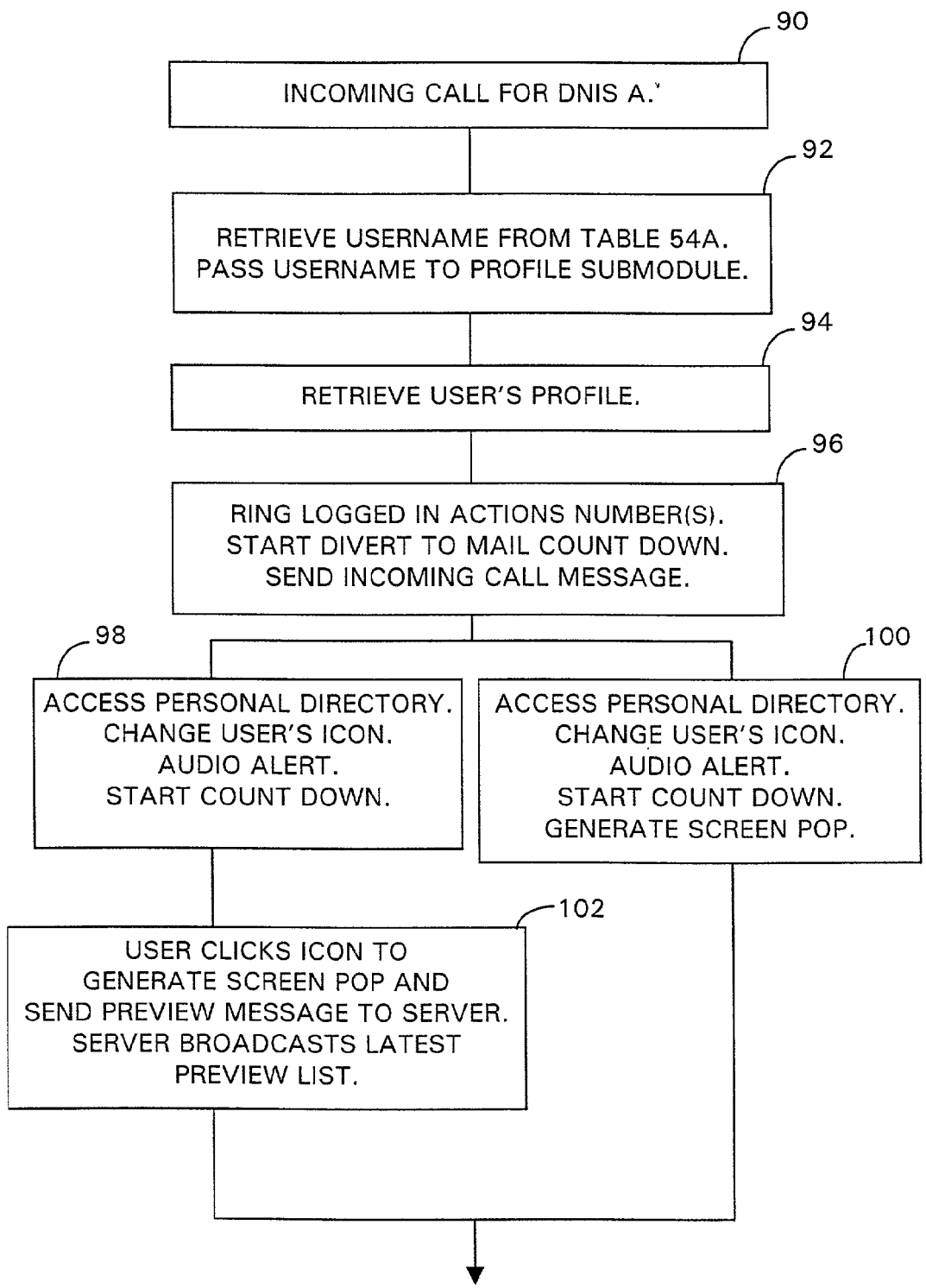
FIGS. 6A and 6B are a flow chart showing steps of a method of the present invention.
Figure 6B:
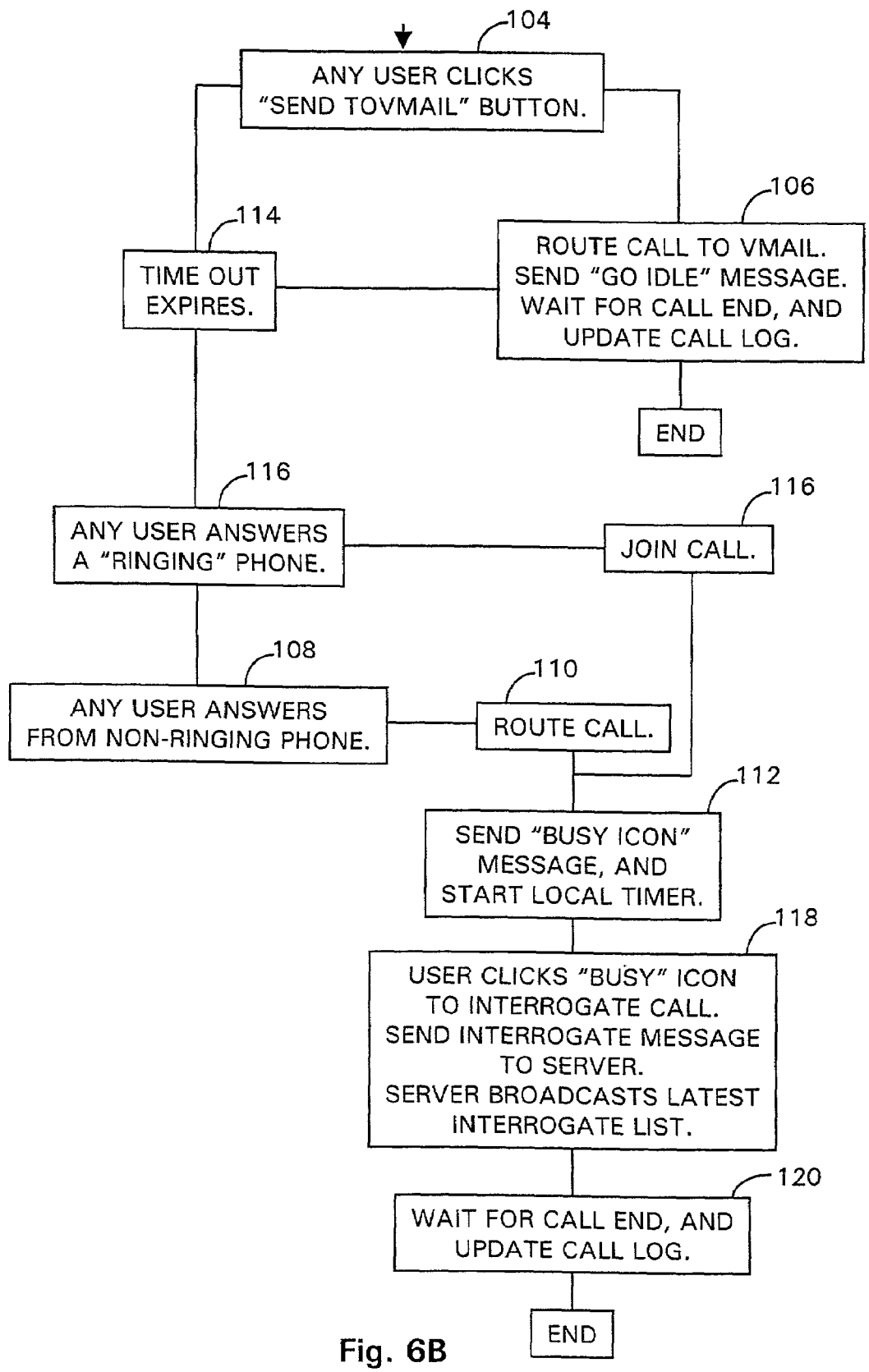

The steps of a preferred method of the present invention will now be described with reference to the flow chart of FIGS. 6A and 6B.

At step 90, the PBX 12 receives an incoming call from the ISDN 14, retrieves from the call signalling data a CLI, i.e. the telephone number of the calling terminal, constituting a caller identity of the present invention, and also a DNIS, i.e. the dialled telephone number, constituting a called user identity of the present invention, allocates a unique call ID, and passes all this data to the CTI server 18 in a Route Request message.

At step 92, the Incoming Call module 60 uses the received DNIS to access the DNIS-to-username translation table 54A (FIG. 5), retrieve a username associated with the received DNIS, and pass the username to the Profile submodule 66. Some users, e.g. those with usernames X and Y in FIG. 5, might be associated with two or more different DNISs, e.g. one for private calls, and another for business calls.

At step 94, the Profile submodule 66 uses the retrieved username to access the profiles 52 and retrieve a profile associated with the retrieved username. This profile contains the data on how that user wishes the CTI server 18 to handle the user's telephony events. A current status flag associated with the Logged In Actions and Logged Out Actions sections determines which of these two is made available to the Server Preview submodule 68. In a variant, the CTI server 18 manages a list of logged in users, which the Profile submodule 66 consults to ascertain which of the two Actions sections is to be used.

At step 96, assuming that the user is logged in, the Server Preview submodule 68 refers to the user's Logged In Actions section of the retrieved profile and commands the PBX to make a respective internal call to the or each number listed, the calls being made simultaneously when there are two or more numbers listed; loads a countdown timer with the value listed for Divert To Mail After Timeout; and starts the countdown timer. In this example it will be assumed that the user has not selected Home or Mobile, and has not selected Divert To Mail. In other words, the list contains only the default number for This Desk. The Server Preview submodule 68 also, in known manner, instructs the PBX 12 to monitor and report telephony activity at the or each such PBX extension listed in the user's Logged In Actions. Accordingly, in this example, the PBX 12 reports that it has made a call, i.e. applied ringing current, to the PBX extension for the This Desk number, and reports the PBX-allocated call ID for that call. If the user has more than one number listed in his Logged In Actions, the PBX 12 reports the respective PBX-allocated call ID for each such call. The PBX also reports the allocated call ID when it makes a call to a remote network destination, e.g. a user's telephone 28R.

Also, at step 96, the Server Preview submodule 68 retrieves contents of the store 48 associated with the retrieved username, i.e. all users recorded as having declared an interest in the telephony status of the called user, and sends a Call Received message to each of the usernames retrieved from the respective store 48 at the clients where those users are currently recorded as being logged in. Hereinafter, with respect to a called user, these users are referred to as the store 48 members. This Call Received message comprises an incoming call ID; the CLI; a corresponding callername, if there is an entry in the table 54, otherwise the text Unknown; the retrieved username; the countdown timer start value; and any notes that the user has entered.

At step 98, at the clients of all the store 48 members the respective Client Preview module 82 accesses the user's downloaded personal directory using the CLI received from the Server Preview submodule 68 and checks whether the user has entered a "familiar" or informal name for that CLI, i.e. a name other than a formal name held in the system-associated translation tables. Different store 48 members might have different familiar names for a given caller. If the user has no entry in his personal directory for that CLI, the Client Preview module 82 changes the telephony status bar in the called user's icon from green fill with the text "Free" to red fill with either the received callername or "Unknown" to indicate that a new call has arrived for that user. However, if there is such an entry, the Client Preview module 82 retrieves the familiar name, changes the telephony status bar in the called user's icon to red fill with the retrieved familiar name. The Client Preview module 82 also generates an audio alert via a sound card of the client; and loads a countdown timer with the received start value and starts the timer.

At step 100, at the called user's client only, the Client Preview module 82 additionally generates a screen pop bearing the title "Incoming Call For:", followed by the called username. The screen pop displays information comprising current date and time, the CLI, the familiar name (if any), the notes, and the current countdown timer value; and includes buttons for Answer, End Call, Send to Vmail, Apply and Dismiss, and an icon for Personal Directory. The operation of these buttons, other than those for Apply and Personal Directory, is self-evident and will not be described. The Apply button is used to send an Apply message to the CTI server 18 with any changes that the user has entered via the screen pop. For example, if neither the global directory in the CTI server 18, nor the user's personal directory yet contains an entry for the received CLI, the user can overwrite "Unknown" with a name and click on Apply. This creates an entry in the user's personal directory and sends an Apply message to the CTI server 18. Similarly, the user can update the notes and click on the Apply button. The Personal Directory button is conventional, except that when the user clicks on this button, the list of names of his personal directory appears in a window, with the entry corresponding the current CLI highlighted and thus ready for immediate selection, if there is such an entry. This facilitates situations where the user wishes to add the name and address details of a new caller by first typing the caller's name over "Unknown" and clicking on the Apply button, then clicking on the Personal Directory button, then clicking on a Select button in the personal directory window to gain access to an address part of the personal directory for the new entry. The user then types in the address details and clicks on the Apply button to effect the entry into his personal directory of the new text and to send a corresponding Apply message to the CTI server 18.

At step 102, any of the store 48 members, other than the user himself, who already has the relevant screen pop on his screen, can click on the user's icon to preview the call. This activates the Client Preview module 82 to generate an incoming Call screen pop to be displayed on that member's screen, using the information received from the Server Preview submodule 68, and to send a Preview Call message to the Server Preview submodule 68. The Server Preview submodule 68 upon receipt of a first Preview Call message for that call ID generates a respective Preview List for that call ID, adds that member's username to the Preview List, broadcasts the Preview List to all the store 48 members, and passes the Preview List to the Call Log module 64 for storing. For subsequently received Preview Call messages for that call ID, the Server Preview submodule 68 adds the respective members' usernames to the existing Preview List.

The clients are arranged to display the received Preview List in the Incoming Call For screen pop. In this way, when a member previews the user's incoming call, the member can see who is calling, any notes that the user has entered in his profile for that caller, who else is previewing that call, and the time left before the call is sent to Voice Mail.

In a variant, the Client Preview module 82 is arranged to start a respective local timer, i.e. a countup timer for measuring the duration of the preview, for each new name in a received Preview List, and to display the current value of this local timer adjacent to the displayed name. In an example of the use of this variant, a member previews a call for a user who is temporarily not at his work station, and sees that member B has been previewing for 3 seconds, member C has been previewing for 5 seconds, member D has been previewing for 10 seconds, and that the time remaining before divert to Voice Mail is 5 seconds. The newly previewing member can make the assumption that member D, on the basis of the notes and perhaps member D's own knowledge of the likelihood that the called user would want the call answered, is happy to answer the call shortly before the countdown expires; and also that members B and C are likely to close their screen pop and leave any further action to member C.

When a member closes their screen pop, in conventional manner by clicking on a Quit button, or on the standard Windows "X" close icon, their Client Preview module 82 sends a Cease Preview message to the CTI server 18, where the Server Preview submodule 68 updates the Preview List by deleting that member's username from the Preview List, and sending the updated Preview List to all the store 48 members.

Suppose that a store 48 member knows that the user is temporarily absent from his client, and that, upon previewing an incoming call for the user, the notes indicate that the user wishes any call from that caller to be not answered but sent to Voice Mail. That member can, with confidence that he is acting in accordance with the user's wishes, click on the Send To Voice Mail button, at step 104. The member's client sends a Send To Voice Mail message to the CTI server 18, which, at step 106, routes the call to the Voice Mail equipment, sends a Go To Idle message in respect of that call ID to all the store 48 members, and when it has received acknowledgements from all the clients, it updates the details of the call in the call log 56. When a client receives a Go To Idle message, its Client Preview module 82 changes the telephony status of the respective icon back to Free with green fill.

Suppose, as a second example, that a store 48 member knows that the user is temporarily absent from his client, and that, upon previewing an incoming call for the user, the notes indicate that a call from that caller is important and should be answered, if possible. That member can note the displayed countdown timer value in seconds, and wait until just before the CTI server 18 would have routed the call to the Voice Mail equipment in case the called user returns and is then available to answer the call, and then, in a step 108, click on the Answer button. That member's client sends an Answer message to the CTI server 18, which, in a step 110, routes the call to the answering member, and then, at step 112, sends a Set Icon To Busy message in respect of the answering member and a Start Local Call Timer message to all the clients, and updates the details of the call in the call log 56.

Suppose, in a variation of this second example, that several store 48 members have previewed the call. Each time that another such member begins, or ceases, previewing the call, the CTI server 18 broadcasts an updated Preview List to all the store 48 members. Thus, a member can see which other members are previewing the call, and if, in his opinion, he is not the most appropriate of the previewing members to answer the call, he can cease previewing the call, in which case, his client sends a Cease Preview message to the CTI server 18, which then broadcasts an updated Preview List. It may be that when a member previews a call, he sees that several other members are also previewing the call, but that, while he is previewing the call, he can see their names disappear from the previewing list as they cease previewing, until only he is previewing the call. That member now knows that those other members will have seen that he was previewing the call, and that they all considered him to be a more appropriate member to answer the call.

If none of the store 48 members sends the call to Voice Mail at step 104 or answers the call at step 108, then at step 114 the countdown timer in the CTI server 18 reaches zero, also referred to as the timeout expiring, and the CTI server 18 performs step 106 to route the call to the Voice Mail equipment, to instruct the clients to Go To Idle, and to update the call log 56.

If any member answers the call by picking up the handset at the alerting, i.e. ringing, telephone, this member being usually but not always the called user, then at step 116 the CTI server 18 receives a report from the PBX 12 containing, in known manner, the PBX extension number, the PBX-allocated internal call ID and an indication that the call is answered. The Server Preview submodule 68 now sends a Join message to the PBX 12 containing the external ID of the incoming call and the internal ID of that answered call, and then the CTI server 18 performs step 112 to send a Set Icon To Busy message in respect of the called user and a Start Local Call Timer message to all the clients, and update the details of the call in the call log 56.

After a call has been answered by one of the store 48 members, including the user, that member's icon indicates that he is busy on a call, and any other member can, at step 118, interrogate that call by clicking on the member's icon. An Incoming Call For screen pop is displayed, but now instead of a section of the screen pop being dedicated to names of previewing members, that section now indicates the names of interrogating members; and the timer display, instead of being the countdown to Send To Voice Mail, is now the local timer count of the call duration. The client of an interrogating member sends an Interrogation message to the CTI server 18, which adds the name of that member to an Interrogation List, and broadcasts the Interrogation List to the clients of all the store 48 members.

Finally, at step 120, when the user ends the call by replacing his handset, the PBX 12 reports this to the CTI server 18, with the end time of the call. The CTI server 18 now updates the call log 56 with the end time of the call, deletes the contents of the Interrogation List, and sends a Go To Idle message in respect of that user's icon to all the the store 48 members.

If the user ends the call by clicking on an End Call button on his screen, his client sends a Call Ended message to the CTI server 18, which instructs the PBX 12 to end the call. When the PBX 12 has completed that instruction, it reports this to the CTI server 18, with the end time of the call, as above, and the CTI server 18 responds in the same way.

If a user logs on, his username being thereby added to the relevant store 48, after an incoming call has been received at the PBX 12 and before it has been answered or sent to Voice Mail, the CTI server 18 sends that user's client in respect of that call all the call information including the latest broadcast Preview List, if any, but not including the countdown timer start value. In this case, if the user previews the call, he will have a display of all the usual information other than the countdown to divert.

In a variant, the CTI server 18 sends, upon user log on, a time message to synchronise the client's clock, and, in respect of any such existing call, information for enabling the client to calculate and display a countdown to divert. This information could be: the time at which divert will take place, and the client would calculate the difference between current time and "divert" time and put this difference into the countdown timer; or the time at which the call was received, together with the countdown value, and the client could calculate how much time was left, and put that into the countdown timer. Any such suitable method could be employed for obtaining the displayed countdown at a client where a user logs on after a call has been received.

In a variant, instead of displaying the caller's name in the telephony status bar against a red fill, the Client Preview module 82 displays the text "Ringing" against a red fill.

Whereas the specific embodiments described above are based on a switch in the form of a PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones at the workstations can connect to their respective clients via Internet phone jacks, and in an alternative arrangement telephony can be provided for the user via a sound card in his client.

Thus, it can be seen that in general the present invention can be implemented in any computer controlled switch, by means of a suitable controlling program.

In the above specific embodiments, the called user is an individual person who normally works at a workstation. It will be appreciated that a DNIS need not correspond to an individual person, but may relate to a department or group, or a specific function within a company. Furthermore, more than one DNIS can correspond to such a function.

Similarly, the present invention includes caller identities other than the abovementioned CLI. These include a cell identity when the caller is using a mobile telephone, an alphanumeric string, an Internet Protocol address, and "null" information, e.g. where a caller has withheld his CLI.

It will also be appreciated that the term CTI, although originating from the computer control of voice telephony, is not limited to voice communications and includes other types of communications, e.g. videotelephony, and multimedia.

In the abovedescribed specific embodiments, the CTI server 18 sends a message to the computer for each of the store 48 members. In this way, the called user will get a screen pop including a "caller identity", i.e. details of the caller, immediately or after a defined time. The caller identity being typically the CLI (or a null identity if CLI is withheld) or equivalent, and any translation to a name for the caller (or Unknown if no translation is found). Each active computer, other than the called user, receives the message, but does not display the caller identity until the workgroup member clicks on the called user's icon. In a variant, only the called user is sent a message including the caller identity, and the other active computers receive a message containing only the called user identity. In this case, when a workgroup member clicks on the called user's icon, a request is sent from his computer to the CTI server 18 for a return message containing the caller identity.

Furthermore, whereas the abovedescribed specific embodiments are third party CTI arrangements, the skilled person will appreciate that the present invention is also applicable to first party CTI arrangements.

Whereas in the abovedescribed embodiments the user can divert his incoming calls to Voice Mail, it will be appreciated that the destination for the divert can be any suitable answering service.

The invention claimed is:

1. A method of operating a computer telephony integration (CTI) system comprising a switch and a CTI controller therefor, and a plurality of user workstations, each workstation comprising a computer connected to the CTI controller and a telephone connected to the switch, the method comprising the steps of:
   storing, for users of the system, respective user-associated profiles, each including a user-associated workgroup containing identities of users of the system, in whose telephony status the user associated with that workgroup is interested;
   responding to receipt of an incoming call at the switch by retrieving from signalling data of that incoming call a called user identity and a caller identity;
   retrieving from the profile corresponding to the retrieved called user identity a value for the length of time that the incoming call is to be allowed to remain unanswered before routing the call to an answering facility;
   starting a call-associated countdown from said value;
   sending incoming call details including at least said called user identity from the CTI controller to each computer at which a user, whose workgroup contains that called user identity, is currently logged on to the CTI controller, such computer being referred to hereinafter as an active computer;
   responding to receipt of said incoming call details at said active computers by displaying an indication that an incoming call has been received for the called user; and
   responding to a request, made by a user at a said active computer, for details of that incoming call, by displaying at that active computer details of that incoming call comprising the current value of said call-associated countdown and at least said caller identity, such a user being referred to hereinafter as a previewing user.

2. A method as claimed in claim 1, wherein said call-associated countdown is performed by the CTI controller, and wherein the step of responding to a said request comprises a substep of requesting from the CTI controller the current value of said call-associated countdown, and including the steps of sending the requested current value to the computer of the previewing user in response to the request for said current value, and starting in that computer a call-associated countdown from the current value received thereat.

3. A method as claimed in claim 1, wherein the step of sending incoming call details to each active computer includes sending said retrieved value, and wherein each said active computer performs a respective call-associated countdown.

4. A method as claimed in claim 1, including the steps of:
   maintaining, for said incoming call, a respective call-associated previewing user list by adding to that list the identity of a previewing user upon the making of said request and deleting from that list the identity of a previewing user upon receipt of a message indicating that that previewing user has ceased to preview the details of that incoming call;
   upon each change in the content of said previewing user list, sending the latest previewing user list, from the CTI controller to each active computer; and
   while displaying the details of said incoming call at a said active computer, additionally displaying the latest received previewing user list.

5. A method as claimed in claim 4, including the steps of starting, in each respective active computer, a respective preview duration measurement for each new previewing user in the latest received previewing user list, and, while displaying the latest received previewing user list, additionally displaying, for each displayed previewing user, the current value of the respective preview duration measurement.

6. A method as claimed in claim 1, wherein the step of sending incoming call details to each active computer includes sending a caller identity.

7. A method as claimed in claim 1, wherein the step of responding to a said request comprises a substep of requesting from the CTI controller the caller identity of that incoming call, and including the step of sending the requested caller identity to the computer of the previewing user in response to the request for said caller identity.

8. A method of operating a computer telephony integration (CTI) system comprising a switch and a CTI controller therefor, and a plurality of user workstations, each workstation comprising a computer connected to the CTI controller and a telephone connected to the switch, the method comprising the steps of:

storing, for users of the system, respective user-associated profiles, each including a user-associated workgroup containing identities of users of the system, in whose telephony status the user associated with that workgroup is interested;

responding to receipt of an incoming call at the switch by retrieving from signalling data of that incoming call a called user identity and a calling line indication;

sending incoming call details, including at least said called user identity and said calling line indication, from the CTI controller to each computer at which a user, whose workgroup list contains that called user identity, is currently logged on to the CTI controller, such computer being referred to hereinafter as an active computer;

responding to receipt of said incoming call details at said active computers by displaying an indication that an incoming call has been received for the called user;

answering said incoming call;

sending an indication that the incoming call has been answered, from the CTI controller to said active computers, and in response converting the display thereat to an indication that the incoming call has been answered;

responding to a request, made by a user at a said active computer, for details of that answered call, by displaying at that active computer details of that answered call comprising at least said calling line indication, such a user being referred to hereinafter as an interrogating user.

9. A method as claimed in claim 8, wherein the step of responding to a said request comprises a substep of requesting from the CTI controller, the caller identity of that answered call, and including the step of sending the requested caller identity to the computer of the interrogating user in response to the request for said caller identity.

10. A method as claimed in claim 8, including the step of further responding to the answering of the incoming call by starting a call-associated call duration measurement; and wherein the response to receipt of said request includes additionally displaying the current value of said call duration measurement.

11. A method as claimed in claim 10, wherein said call duration measurement is performed by the CTI controller, and wherein the step of responding to a said request comprises a substep of requesting from the CTI controller the current value of said call duration measurement, and including the steps of sending the requested current value to the computer of the interrogating user in response to the request for said current value, and starting in that computer a call-associated timer from the current value received thereat.

12. A method as claimed in claim 10, wherein each said active computer starts a respective call-associated timer upon receipt of the indication that the incoming call has been answered.

13. A method as claimed in claim 8, including the steps of:

maintaining at the CTI controller, for said answered incoming call, a respective call-associated interrogating user list by adding to that list the identity of an interrogating user upon the making of said request and deleting from that list the identity of an interrogating user upon receipt of a message indicating that the interrogating user has ceased to interrogate the details of that answered call;

upon each change in the content of said interrogating user list, sending the current interrogating user list from the CTI controller to each active computer; and while displaying the details of said answered incoming call at a said active computer, additionally displaying the latest received interrogating user list.

14. A method as claimed in claim 13, including the steps of timing for each interrogating user the respective interrogation duration; and, while displaying the latest received list of interrogating users, additionally displaying, for each displayed interrogating user, the current value of the respective interrogation duration.

15. A method as claimed in claim 14, wherein each active computer performs said step of timing for each interrogating user the respective interrogation duration.

16. A method as claimed in claim 1, including the steps of:

accessing a caller identity-to-name translation table in accordance with the retrieved caller identity; and if a corresponding caller name is retrieved, displaying the retrieved caller name in conjunction with said caller identity, else, displaying in conjunction with said caller identity an indication that the caller is unknown.

17. A method as claimed in claim 1, including the steps of accessing, in accordance with the retrieved caller identity, a called user-associated caller identity-to-informal name translation table; and, if a corresponding personal name is retrieved, displaying the retrieved informal name in conjunction with said caller identity.

18. A method as claimed in claim 17, including, when a corresponding informal name is not retrieved, the steps of:

accessing a system-associated caller identity-to-formal name translation table in accordance with the retrieved caller identity; and, if a corresponding formal caller name is retrieved, displaying the retrieved formal caller name in conjunction with said caller identity, else, displaying in conjunction with said caller identity an indication that the caller is unknown.

19. A method as claimed in claim 17, including the step of downloading a user's caller identity-to-informal name translation table from the CTI controller upon log on of that user to the CTI controller, and wherein the step of accessing a caller identity-to-informal name translation table associated with the called user is performed by the respective user active computer.

20. A method as claimed in claim 19, including the steps of:

accessing, in the CTI controller, a system-associated caller identity-to-formal name translation table in accordance with the retrieved caller identity; and, if a corresponding caller name is retrieved, sending the retrieved formal caller name from the CTI controller to each active computer for display in conjunction with said caller identity, else, sending from the CTI controller to each active computer, for display in conjunction with said caller identity, an indication that the caller is unknown.

21. A computer telephony integration (CTI) system comprising a switch and a CTI controller therefor, and a plurality of user workstations, each workstation comprising a computer connected to the CTI controller and a telephone connected to the switch, in which system the CTI controller is arranged:

to store, for users of the system, respective user-associated profiles, each profile being arranged to include a user-associated workgroup for containing identities of users of the system, in whose telephony status the user associated with that workgroup is interested, and being arranged to store a value for the length of time that an incoming call is to be allowed to remain unanswered before routing the call to an answering facility;

to respond to receipt of an incoming call at the switch by retrieving from signalling data of that incoming call a called user identity and a caller identity; and to retrieve from the profile corresponding to the retrieved called user identity a said value;

to send incoming call details including at least said called user identity to each computer at which a user, whose workgroup contains that called user identity, is currently logged on to the CTI controller, such computer being referred to hereinafter as an active computer; and each active computer being responsive to receipt of said incoming call details at said active computers to display an indication that an incoming call has been received for the called user; and the system further comprising means for performing a call-associated countdown starting from said value;

means responsive to a request, made by a user at a said active computer, for details of that incoming call, to display at that active computer details of that incoming call comprising the current value of said call-associated countdown and at least said caller identity, such a user being referred to hereinafter as a previewing user.

22. A system as claimed in claim 21, wherein the CTI controller constitutes said means for performing a call-associated countdown and is responsive to a request for said current value to send the requested current value to the computer of the previewing user, and wherein each computer constitutes a respective means responsive to a request for details of that incoming call and is arranged to request from the CTI controller the current value of said call-associated countdown and to start a call-associated countdown from the current value received thereat.

23. A system as claimed in claim 21, wherein the CTI controller is arranged to send said retrieved value to each active computer as part of the incoming call details; and wherein each computer constitutes a respective means for performing a call-associated countdown starting from said value, and a respective means responsive to a request, and is arranged additionally to display the current value of said call-associated countdown.

24. A system as claimed in claim 21, wherein the CTI controller is arranged to maintain, for said incoming call, a respective call-associated previewing user list by adding to that list the identity of a previewing user upon the making of said request and deleting from that list the identity of a previewing user upon receipt of a message indicating that that previewing user has ceased to preview the details of that incoming call, and to send to each active computer, upon each change in the content of said previewing user list, the latest previewing user list; and wherein said means responsive to a request for details of that incoming call is arranged, while displaying the details of said incoming call at a said active computer, additionally to display the latest received previewing user list.

25. A system as claimed in claim 24, wherein each computer is arranged to start a respective countup timer for each new previewing user in the latest received previewing user list, and, while displaying the latest received previewing user list, additionally to display, for each displayed previewing user, the current value in the respective countup timer.

26. A system as claimed in claim 21, wherein the CTI controller is arranged to send a caller identity in conjunction with said caller user identity.

27. A system as claimed in claim 21, wherein the means responsive to a request for details of that incoming call is constituted by the CTI controller together with respective means at the active computers arranged to request from the CTI controller the caller identity of that incoming call, the CTI controller being responsive to the request for said caller identity to send the requested caller identity to the computer of the previewing user.

28. A computer telephony integration (CTI) system comprising a switch and a CTI controller therefor, and a plurality of user workstations, each workstation comprising a computer connected to the CTI controller and a telephone connected to the switch, in which system:

the CTI controller is arranged
to store, for users of the system, respective user-associated profiles, each including a user-associated workgroup containing identities of users of the system, in whose telephony status the user associated with that workgroup is interested;

to respond to receipt of an incoming call at the switch by retrieving from signalling data of that incoming call a called user identity and a caller identity;

to send incoming call details, including at least said called user identity and said caller identity, to each computer at which a user, whose workgroup contains that called user identity, is currently logged on to the CTI controller, such computer being referred to hereinafter as an active computer; and to respond to answering of said incoming call by sending an indication that the incoming call has been answered to said active computers;

each computer is arranged, when active,
to respond to receipt of said incoming call details by displaying an indication that an incoming call has been received for the called user, and to respond to receipt of the indication that the incoming call has been answered by converting the display thereat to an indication that the incoming call has been answered; and there is provided
means responsive to a request, made by a user at a said active computer, for details of that answered call, to display at that active computer details of that answered call comprising at least said caller identity, such a user being referred to hereinafter as an interrogating user.

29. A system as claimed in claim 28, wherein the means responsive to a request for details of that answered call is constituted by the CTI controller together with respective means at the computers arranged to request from the CTI controller the caller identity of that incoming call, the CTI controller being responsive to the request for said caller identity to send the request caller identity to the computer of the interrogating user.

30. A system as claimed in claim 28, including means for responding to the answering of the incoming call by starting a call-associated call duration measurement; and wherein the means responsive to a request for details of that answered call is arranged additionally to display the current value of said call duration measurement.

31. A system as claimed in claim 30, wherein said means for responding to the answering of the incoming call is constituted by the CTI controller; and wherein the means responsive to a request for details of that answered call is additionally arranged to request from the CTI controller the current value of said call duration measurement, to associate a timer with that answered call and to start that timer from the current value received from the CTI controller.

32. A system as claimed in claim 30, wherein each computer constitutes
- a respective said means for responding to the answering of the incoming call by starting a call-associated call duration measurement and is arranged to start a respective call-associated time upon receipt of the indication that the incoming call has been answered, and
- a respective said means responsive to a request for details of that answered call, to display as that active computer details of that answered call, and
- is arranged additionally to display the current value of said call duration measurement.

33. A system as claimed in claim 28, wherein the CTI controller is arranged to maintain, for said answered incoming call, a respective call-associated interrogating user list by adding to that list the identity of an interrogating user upon the making of said request and deleting from that list the identity of an interrogating user upon receipt of a message indicating that that interrogating user has ceased to interrogate the details of that answered call; and to send to each active computer, upon each change in the content of said interrogating user list, the latest interrogating user list; and wherein said means responsive to a request for details of that answered call is arranged, while displaying the details of said answered call at a said active computer, additionally to display the latest received interrogating user list.

34. A system as claimed in claim 33, including means for timing for each interrogating user the respective interrogation duration; and wherein the means responsive to a request is arranged additionally to display, for each displayed interrogating user, the current value of the respective interrogation duration.

35. A system as claimed in claim 34, wherein each active computer constitutes a respective means for timing for each interrogating user the respective interrogation duration.

36. A system as claimed in claim 21, including caller identity-to-name translation means responsive to the retrieved caller identity to provide a translation result, and wherein the means responsive to a request is arranged to display the translation result in conjunction with said caller identity.

37. A system as claimed in claim 36, wherein the caller identity-to-name translation means includes a system-associated caller identity-to-formal name translation table and respective user-associated caller identity-to-informal name translation tables.

38. A system as claimed in claim 37, wherein the caller identity-to-name translation means is arranged to access the system-associated caller identity-to-formal name translation table only in the event that accessing the caller identity-to-informal name translation table associated with the called user fails to retrieve a corresponding informal name.

39. A system as claimed in claim 37, wherein the CTI controller is responsive to log on of a user to the CTI controller to download that user's caller identity-to-informal name translation table to the computer at which that log on is performed, and wherein that user's computer constitutes part of said caller identity-to-name translation means.

40. A system as claimed in claim 39, wherein the system-associated caller identity-to-formal name translation table is disposed at the CTI controller, and the caller identity-to-name translation means is responsive to the retrieved caller identity to access the system-associated caller identity-to-formal name translation table and provide a translation result in the form of either a retrieved corresponding caller name or an indication that the caller is unknown, and is arranged to send the translation result from the CTI controller to each active computer for display in conjunction with said caller identity.

* * * * *